(12) United States Patent
Yuniardi et al.

(10) Patent No.: US 8,826,148 B2
(45) Date of Patent: Sep. 2, 2014

(54) SIMULTANEOUS EMAIL AND ATTACHMENT VIEWING

(75) Inventors: Nino Yuniardi, Seattle, WA (US); Tracy Schultz, Seattle, WA (US); Jeffrey Kohler, Redmond, WA (US); Steve Geffner, Bothell, WA (US); Doug Herman, Issaquah, WA (US); Gary Caldwell, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 42 days.

(21) Appl. No.: 13/101,344

(22) Filed: May 5, 2011

(65) Prior Publication Data
US 2012/0284639 A1    Nov. 8, 2012

(51) Int. Cl.
*G06F 3/00* (2006.01)

(52) U.S. Cl.
USPC .......................... 715/752; 709/206; 715/792

(58) Field of Classification Search
None
See application file for complete search history.

(56) References Cited

U.S. PATENT DOCUMENTS

| | | | |
|---|---|---|---|
| 6,924,827 B1 * | 8/2005 | Gulati et al. ................. | 715/763 |
| 7,576,730 B2 | 8/2009 | Anwar | |
| 7,716,593 B2 | 5/2010 | Durazo et al. | |
| 7,797,638 B2 | 9/2010 | Dev Sareen et al. | |
| 8,185,591 B1 * | 5/2012 | Lewis ........................... | 709/206 |
| 2004/0186762 A1 | 9/2004 | Beaven et al. | |
| 2005/0108338 A1 * | 5/2005 | Simske et al. ................ | 709/206 |
| 2006/0075046 A1 * | 4/2006 | Yozell-Epstein et al. ..... | 709/206 |
| 2009/0210800 A1 | 8/2009 | McCann et al. | |
| 2009/0319618 A1 * | 12/2009 | Affronti et al. ............... | 709/206 |
| 2010/0198927 A1 | 8/2010 | Tonnison | |

OTHER PUBLICATIONS

Tyson, Herbert L.; "Microsoft Word 2007 Bible"; Mar. 12, 2007; Wiley; pp. 796-804.*
"Document Data and Document View in Custom Editors," Visio Studio 2010, Retrieved Date: Feb. 16, 2011: http://msdn.microsoft.com/en-us/library/bb165787%28VS.100%29.aspx.
Steven Sinofsky, "Engineering Windows 7", Oct. 1, 2008: http://blogs.msdn.com/b/e7/archive/2008/10/01/user-interface-managing-windows-windows.aspx.
Andre Da Costa, "My Early experience with the new Windows Live Hotmail!," Blog: Teching It Easy: With Windows, Aug. 1, 2010; All Pages.

* cited by examiner

*Primary Examiner* — Stephen Hong
*Assistant Examiner* — Asher Kells
(74) *Attorney, Agent, or Firm* — Rachael Vaughn; Jim Ross; Micky Minhas (57) ABSTRACT

Systems, methods and computer program products for facilitating the simultaneous (e.g., side-by-side or via a "sliding" animation) displaying and viewing of email messages and any attachments to such email messages are disclosed. Such systems, methods and computer program products allow a user of a computing system to simultaneously view the textual portion of an email along with the contents of any attachments within one application, and without the need to switch between at least two software applications—the email reader application and the native (productivity) application used to create such attachment (e.g., a word processing software application, a spreadsheet application, a presentation application, a database application, a portable document format reader, a Web browser and/or the like).

9 Claims, 5 Drawing Sheets

SIMULTANEOUS EMAIL AND ATTACHMENT VIEWING

CROSS REFERENCE TO RELATED APPLICATIONS

This application is related to U.S. patent application Ser. No. 12/962,740, titled "Organic Projects," filed on Dec. 8, 2010 and incorporated by reference herein as to its entire contents.

FIELD OF THE INVENTION

The present invention generally relates to computer graphical user interfaces and more particularly to systems, methods and computer program products for facilitating the viewing of email messages and document attachments thereto.

BACKGROUND

In today's technological environment, it is common for people to most-frequently communicate via electronic mail (i.e., email) messages. That is, given the proliferation of computers in homes, schools and work places, email messages are frequently exchanged between friends, family, classmates and coworkers, respectively. Such email messages allow near-instant collaboration among such classes of people and has become the communications medium of choice, surpassing traditional, postal mail (i.e., "snail mail" as it is now commonly referred to) and even traditional telephone calls.

As email systems have become more advance, the attachment of word processing documents, spreadsheets, presentation files, photographs, music and multimedia files to accompany typical text email messages have also become commonplace. That is, the technological advancement of email system servers (now allowing the sending and receiving of larger-sized messages), their associated communications networks (with improved transmission bandwidth), and email reader software applications (with improved graphical user interfaces), allow users to not only collaborate via the text contained in the email messages themselves, but via such attachments (and the information contained herein).

As a (negative) result of the above-described technological advancements users often switch between at least two software applications to view the (textual) contents of email messages and to view the contents of any attachments. For example, a user typically may utilize an email reader software application to view the contents of an email message, but must launch a productivity application such as a word processing software application to view the contents of a word processing file attached to the email message. This leads to the often "back-and-forth" between different screens in different software applications executing on a computer system.

Given the foregoing, what are needed are systems, methods and computer program products for facilitating the simultaneous viewing of email messages and any attachments to such email messages.

SUMMARY

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

The present invention meets the above-identified needs by providing systems, methods and computer program products for facilitating the simultaneous viewing of email messages and any attachments to such email messages. As used herein, "simultaneous" refers to the viewing of an email and the contents of any attachments such that they are presented on a display at the same time or nearly at the same time. That is, the present invention provides systems, methods and computer program products to allow a computer user to simultaneously view the textual portion of an email along with the contents of any attachment without the need to launch and switch between at least two software applications executing on the computer.

As a result of the present invention's systems, methods and computer program products, the computer user can simultaneously view the contents of the email message and any attachments all from the email reader software application without the need to launch, for example, a productivity application such as a word processing software application to view the contents of a word processing file attached to the email message, a spreadsheet application to view the contents of an attached spreadsheet, a presentation application to view an attached presentation, a database application to view an attached data file, a Web browser to view an embedded URL link, a document viewer to view a document in a portable document format, and/or the like.

In one embodiment, the simultaneous viewing of the contents of the email and any attachments can be an adjacent (e.g., side-by-side) presentation within the graphical user interface (GUI) of the email reader application. In an alternate embodiment, the simultaneous viewing of the contents of the email and any attachments can be a sliding animation in response to an action by the computer user using an input device such as a mouse (or a finger for touch screen devices). For example, the user, while viewing the contents of an email message, can hover with their mouse over an attachment icon found within the email message, thus causing the email contents to "slide over" and the contents of the attachment to then display within the GUI of the email reader application. In another example, the user, while viewing the contents of an email message, can move their mouse to the extreme (left, right, top or bottom) edge of the screen thus causing the email contents to "slide over" and the contents of the attachment to then simultaneously display within the GUI of the email reader application.

In yet another embodiment, the systems, methods and computer program products of the present invention allow the computer user to simultaneously view not only the contents of an email message and an attachment, but also different (historical) versions of the attachment as the user scrolls up and down through a conversation thread (e.g., an email conversation thread among collaborators working on an attached document such as a word processing file). In such an embodiment, the GUI may display such different versions of the attached document in a "clean" format or in a "redlined" format with indications as to which email sender/author made the relevant (currently displayed) changes.

In yet another embodiment, the systems, methods and computer program products of the present invention allow the computer user to not only simultaneously view the contents of an email message and an attachment, but also to edit the attachment directly from the GUI of the email reader application as if they had launched the native application in which the attachment was originally created.

Further features and advantages of the present invention, as well as the structure and operation of various aspects of the present invention, are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

FIGS. 3-5 are screenshots illustrating exemplary graphical user interface windows for the simultaneous display of email contents and attachments, according to various embodiments of the present invention.

DETAILED DESCRIPTION

The present invention is directed to systems, methods and computer program products for facilitating the simultaneous viewing of email messages and any attachments to such email messages. In various embodiments, the present invention provides systems, methods and computer program products to allow a computer user to simultaneously view the textual portion of an email along with the contents of any attachment (e.g., a word processing document, presentation, spreadsheet, database file, a webpage specified by a URL or the like) without the need to switch between the email reader software application and the relevant (productivity) application that allows the contents of the attachment to be read.

Figure 1:
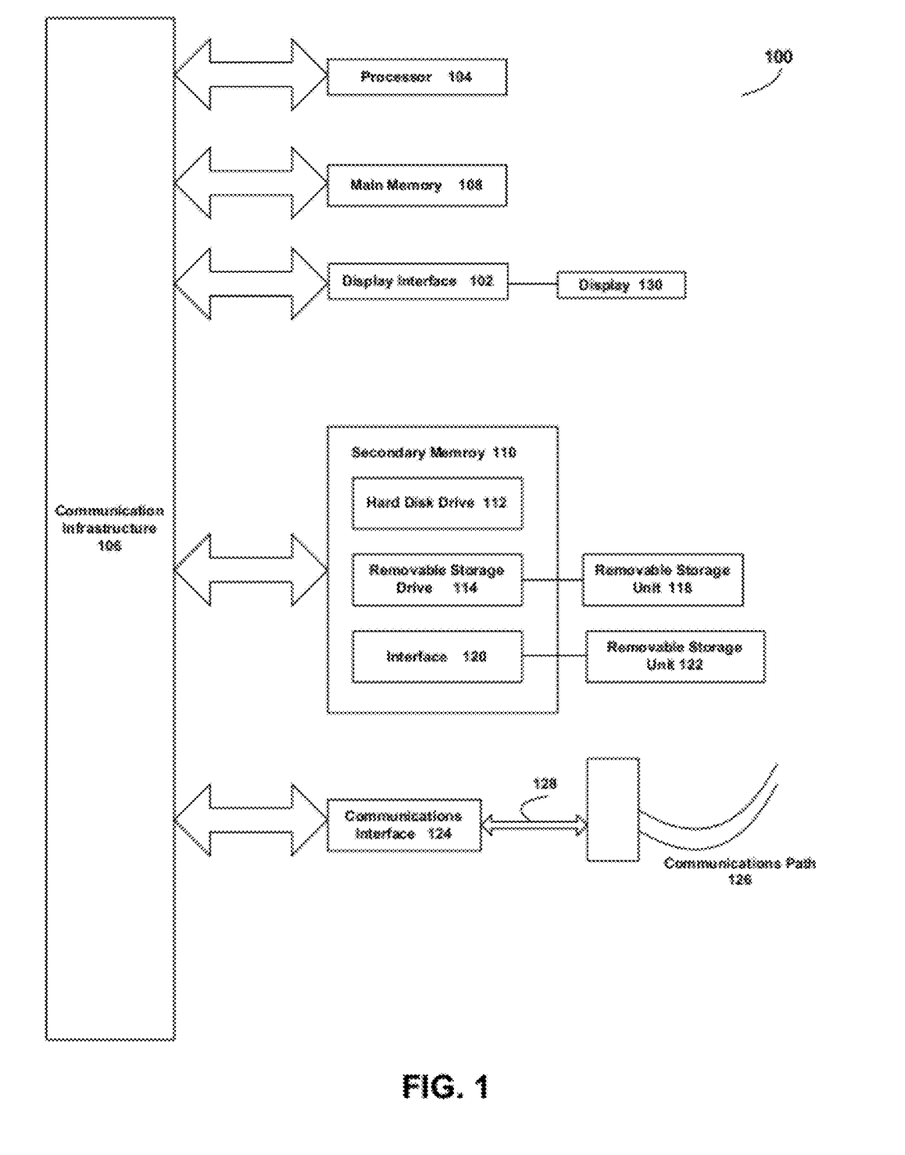
FIG. 1 is a block diagram of an exemplary computer system useful for implementing the present invention.

In one embodiment, the invention is directed toward one or more computer systems capable of carrying out the functionality described herein. An example of a computer system 100 is shown in FIG. 1.

Computer system 100 includes one or more processors, such as processor 104. The processor 104 is connected to a communication infrastructure 106 (e.g., a communications bus or network). Various software aspects are described in terms of this exemplary computer system. After reading this description, it will become apparent to a person skilled in the relevant art(s) how to implement the invention using other computer systems and/or architectures.

Computer system 100 can include a display interface 102 that forwards graphics, text and other data from the communication infrastructure 106 (or from a frame buffer not shown) for display on the display unit 130.

Computer system 100 also includes a main memory 108, preferably random access memory (RAM) and may also include a secondary memory 110. The secondary memory 110 may include, for example, a hard disk drive 112 and/or a removable storage drive 114, representing a floppy disk drive, a magnetic tape drive, an optical disk drive, etc. The removable storage drive 114 reads from and/or writes to a removable storage unit 118 in a well known manner. Removable storage unit 118 represents a floppy disk, magnetic tape, optical disk, etc. which is read by and written to by removable storage drive 114. As will be appreciated, the removable storage unit 118 includes a computer usable storage medium having stored therein computer software and/or data.

In alternative aspects, secondary memory 110 may include other similar devices for allowing computer programs or other code or instructions to be loaded into computer system 100. Such devices may include, for example, a removable storage unit 122 and an interface 120. Examples of such may include a program cartridge and cartridge interface (such as that found in video game devices), a removable memory chip (such as an erasable programmable read only memory (EPROM), or programmable read only memory (PROM)) and associated socket and other removable storage units 122 and interfaces 120, which allow software and data to be transferred from the removable storage unit 122 to computer system 100.

Computer system 100 may also include a communications interface 124. Communications interface 124 allows software and data to be transferred between computer system 100 and external devices. Examples of communications interface 124 may include a modem, a network interface (such as an Ethernet card), a communications port, a Personal Computer Memory Card International Association (PCMCIA) slot and card, etc. Software and data transferred via communications interface 124 are in the form of non-transitory signals 128 which may be electronic, electromagnetic, optical or other signals capable of being received by communications interface 124. These signals 128 are provided to communications interface 124 via a communications path (e.g., channel) 126. This channel 126 carries signals 128 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 114, a hard disk installed in hard disk drive 112 and signals 128. These computer program products provide software to computer system 100. The invention is directed to such computer program products.

Computer programs (also referred to as computer control logic) are stored in main memory 108 and/or secondary memory 110. Computer programs may also be received via communications interface 124. Such computer programs, when executed, enable the computer system 100 to perform the features of the present invention, as discussed herein. In particular, the computer programs, when executed, enable the processor 104 to perform the features of the present invention. Accordingly, such computer programs represent controllers of the computer system 100.

In an embodiment where the invention is implemented using software, the software may be stored in a computer program product and loaded into computer system 100 using removable storage drive 114, hard drive 112 or communications interface 124. The control logic (software), when executed by the processor 104, causes the processor 104 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

As will be apparent to one skilled in the relevant art(s) after reading the description herein, the computer architecture shown in FIG. 1 may be configured as a desktop, a laptop, a server, a tablet computer, a PDA, a mobile computer, an intelligent communications device or the like.

In yet another embodiment, the invention is implemented using a combination of both hardware and software.

Figure 2:
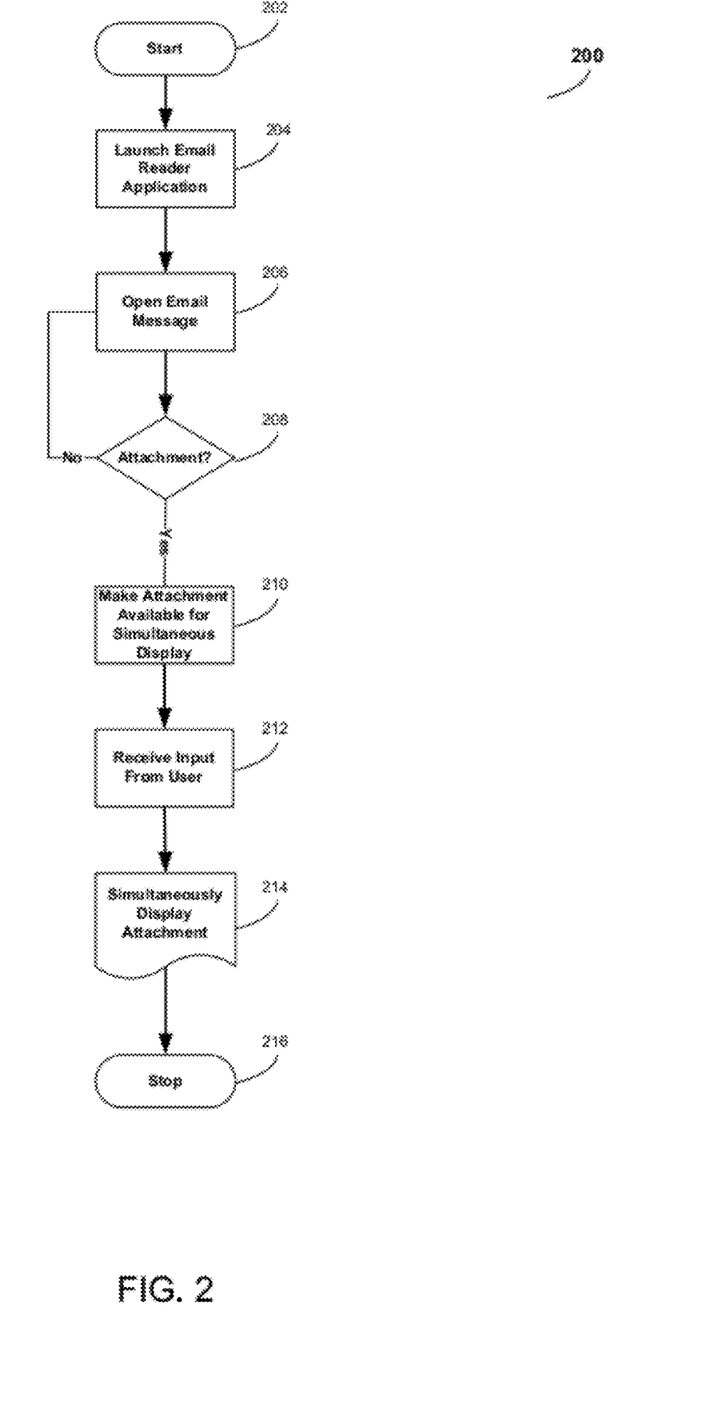
FIG. 2 is a flowchart illustrating an exemplary simultaneous email and attachment displaying/viewing process according to an embodiment of the present invention.

Referring to FIG. 2, a flowchart illustrating an exemplary simultaneous email and attachment displaying/viewing process 200, according to an embodiment of the present invention, is shown. Process 200, which would execute on computer system 100, begins at step 202 with control passing immediately to step 204.

In step 204, a user of computer system 100 launches an email reader application configured and adapted for simultaneous email and attachment view according to an embodiment of the present invention (e.g., the OUTLOOK® application available from Microsoft Corporation of Redmond, Wash.). In step 206, the user would then select and open an email message to read. Then, in step 208, the determination is made as to whether the opened email message contains any associated attachments. If the determination of step 208 is negative, then process 200 proceeds back to 206 thus waiting for the user to open an email containing an attachment. (That is, if there are no attachments, the email reader application executing on system 100 would operate in a typical fashion as will be appreciated by those skilled in the relevant art(s).)

In step 210, when the determination of step 208 is positive (i.e., there are one or more attachments to the email message being opened and read), the attachment is made available for simultaneous viewing within the GUI of the email reader application executing on system 100. (See, e.g., FIG. 3.)

Then, in step 212, the email reader application executing on system 100 detects an input from the user indicative that they desire to simultaneously view of the contents of the email and any attachments. In one embodiment, such input can be received via a mouse, a stylus, a finger for touch screen devices, and/or the like. For example, the user, while viewing the contents of an email message, can hover with their mouse over an attachment icon, click an attachment icon or simply move their mouse to the extreme (left, right, top or bottom) edge of the screen. In an alternate embodiment, as will be appreciated by those skilled in the relevant art(s) after reading the description herein, process 200 may bypass step 212 and automatically present the user with a simultaneous view of the contents of the email and any attachments (e.g., upon opening the email).

In step 214, process 200 causes the GUI of the email reader application executing on system 100 to simultaneously display the contents of the email and at least one attachment for viewing by the user. In alternate embodiments, the simultaneous display may be an adjacent (e.g., side-to-side) view, a "slide over" animation (see, e.g., FIG. 4), a "slide up" animation, a "slide down" animation, a "folding" animation or the like. Process 200 then terminates as indicated by step 216.

Figure 3:
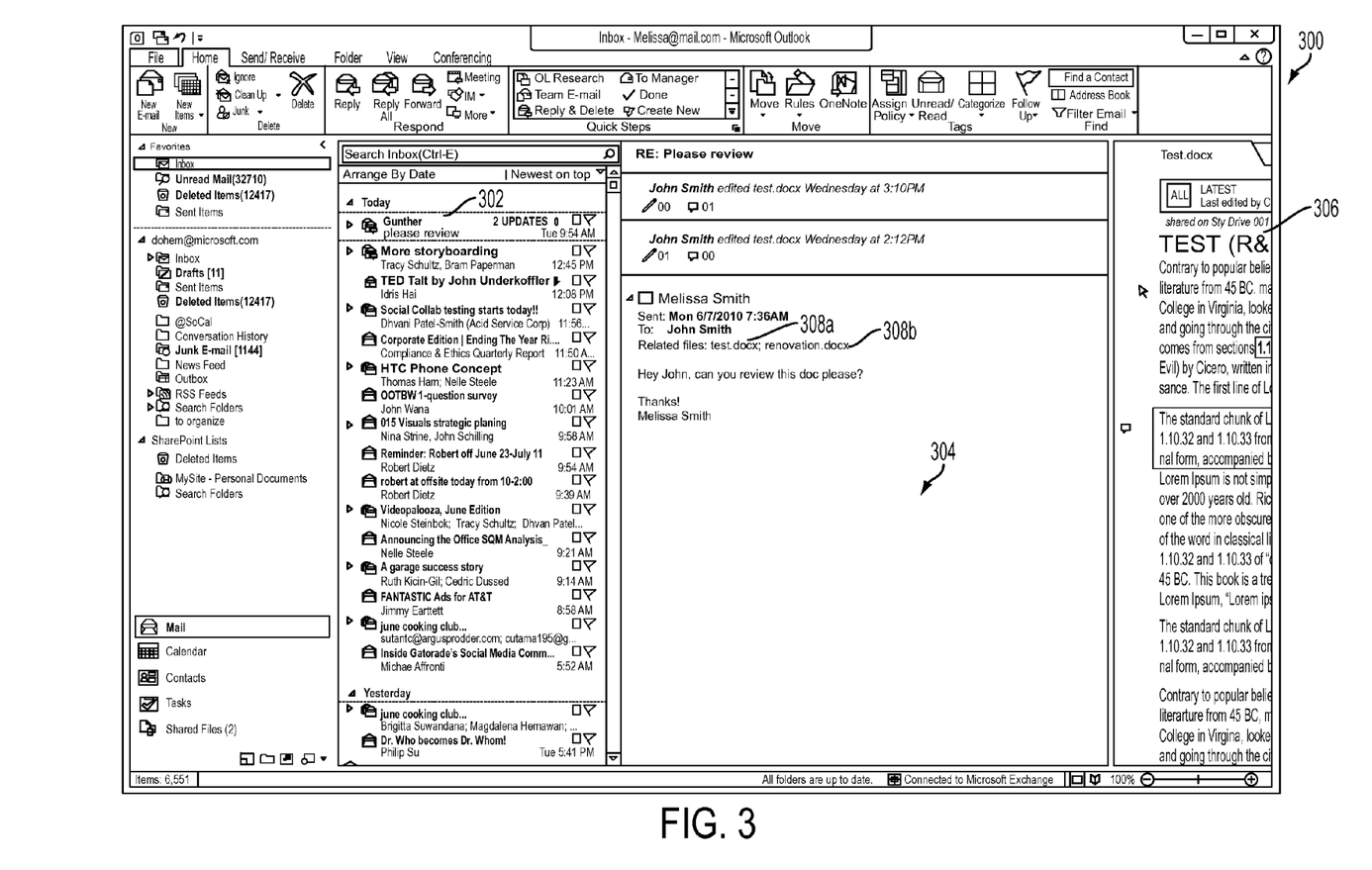

Referring to FIG. 3, a screenshot 300 illustrating an exemplary GUI for the simultaneous display of email contents and attachments, according to an embodiment of the present invention, is shown. Within screenshot 300, the user may select an email 302 to read from their inbox (as in step 206 of process 200) and an email content panel 304 would display the contents of email 302, as well as making available an attachment panel 306 thus making available the contents of one of attachments 308a-b available for simultaneous viewing within the GUI of the email reader application executing on system 100 (as in step 210 of process 200). That is, in such an embodiment, screenshot 300 provides a "sneak peek" of the contents of an attachment 308 available for simultaneous viewing within panel 306 until the email reader application executing on system 100 detects (as in step 212 of process 200) an input from the user indicative that they desire to simultaneously view of the contents of the email and any attachments.

Figure 4:
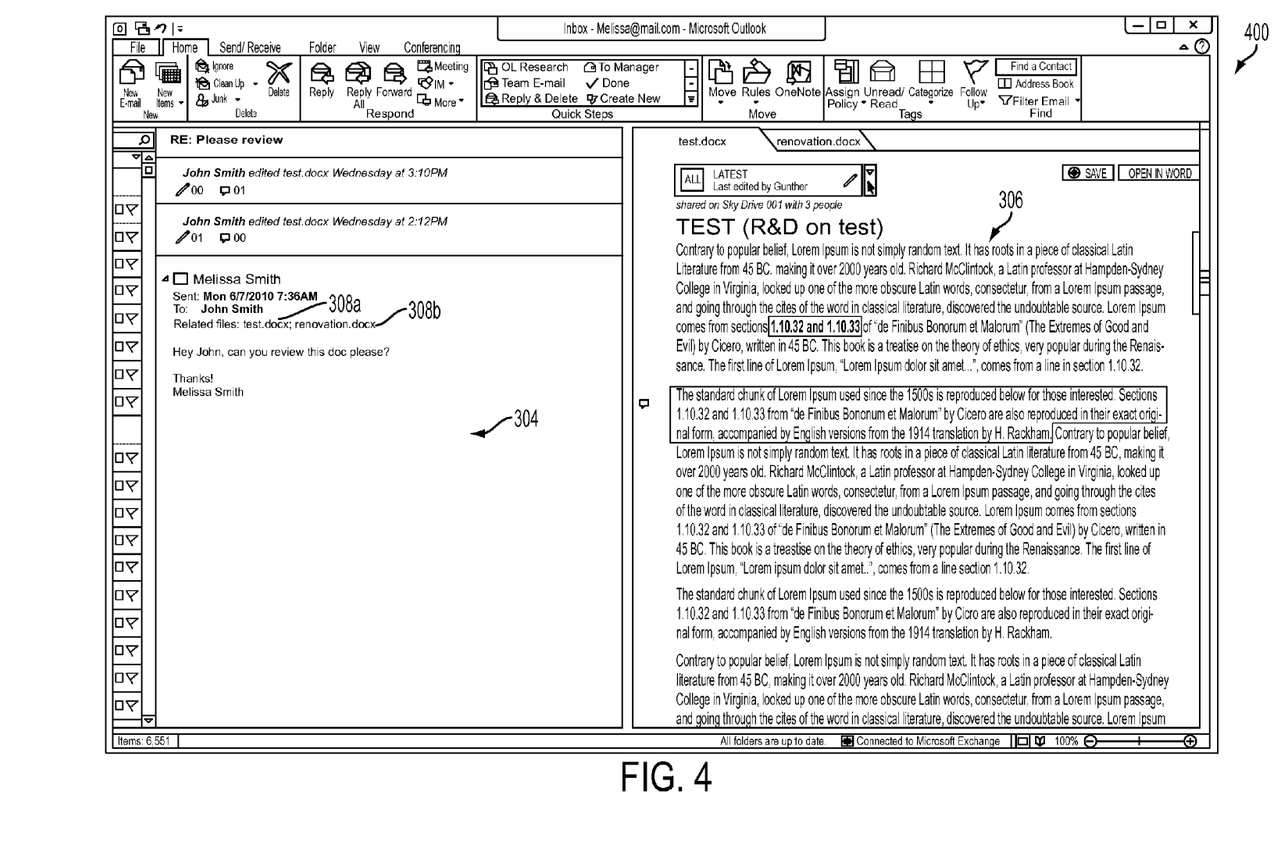

Referring to FIG. 4, a screenshot 400 illustrating an exemplary GUI for the simultaneous display of email contents and attachments, according to an embodiment of the present invention, is shown. Within screenshot 400, content panel 304 simultaneously displays the contents of email 302, and the contents of the attachment (e.g., attachment 308a) for viewing by the user within the email reader application executing on system 100 (as in step 214 of process 200).

Referring to FIG. 5, a screenshot 500 illustrating an exemplary GUI for the simultaneous display of email contents and attachments, according to an embodiment of the present invention, is shown. Within screenshot 500, the contents of one or more emails 302 within a conversation thread in panel 304, and the contents of an attachment 308 in panel 306, are simultaneously displayed for viewing by the user within the email reader application executing on system 100. In such an embodiment of the present invention, process 200 allows the computer user to simultaneously view not only the contents of email message 302 and an attachment 308, but also different (historical) versions of attachment 308 as the user scrolls up and down through a conversation thread (e.g., an email conversation thread among collaborators working on the attached document) within email content panel 304.

In an alternate embodiment, the GUI allows the user to select via, for example, a drop down menu 502, different versions of attached document 308 to display within attachment panel 306. In such an embodiment, the displayed attachment may be shown in a "clean" format or in a "redlined" format with indications as to which email sender/author made the relevant changes.

In yet another embodiment, process 200 allows the computer user to not only simultaneously view the contents of email message 302 and attachment 308, but also to edit attachment 308 directly from the GUI of the email reader application (e.g., within attachment panel 306) as if they had launched the native application in which the attachment was originally created (e.g., a word processing software application, a spreadsheet application, a presentation application, a database application, a Web browser, a document viewer and/or the like).

As will be appreciated by those skilled in the relevant art(s) after reading the description herein, different inputs received from the user by the email reader application (as in step 212 of process 200) would cause the GUI to produce different screens. For example, within screenshot 300, an attached document 308 is visible in panel 306 side-by-side with the email mail content panel 304. In one embodiment, screenshot 300 would result if the user hovers their mouse over the name of the attached document 308 (i.e., there would be a slight slide animation to move panels 304 and 306 side-to-side as a result of the hovering input action by the user). In such an embodiment, the user clicking their mouse on the name of the attached document 308 will result in a complete sliding animation resulting in screenshot 400 (as in step 214 of process 200).

While various aspects of the present invention have been described above, it should be understood that they have been presented by way of example and not limitation. It will be apparent to persons skilled in the relevant art(s) that various changes in form and detail can be made therein without departing from the spirit and scope of the present invention. Thus, the present invention should not be limited by any of the above described exemplary aspects, but should be defined only in accordance with the following claims and their equivalents.

In addition, it should be understood that the figures in the attachments, which highlight the structure, methodology, functionality and advantages of the present invention, are presented for example purposes only. The present invention is sufficiently flexible and configurable, such that it may be implemented in ways other than that shown in the accompanying figures. For example, an embodiment of the present invention allows the GUI of a web browser (or other software application) executing on system 100 to simultaneously display the contents of the email and at least one attachment for viewing by the user (rather than the GUI of an email reader application executing on system 100).

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present invention in any way.

What is claimed is:

1. A computer-implemented method for facilitating the simultaneous viewing of email messages and associated attachments within an email reader application, comprising the steps of:
   (a) providing a graphical user interface (GUI) to a user within the email reader application;
   (b) receiving, via said GUI, a first input from said user, wherein said first input is indicative of an email message said user desires to open;
   (c) displaying to said user, via said GUI and in response to said first input, the contents of said email message, wherein said email message contains at least one attachment, and further displaying to the user a preview of at least a portion of the at least one attachment prior to receiving a second input from the user, the preview displayed at a location corresponding to the location where the at least one attachment would be viewed upon receipt of the second input from said user;
   (d) receiving, via said GUI, the second input from said user, wherein said second input is indicative of said user desiring to view the content of said attachment; and
   (e) displaying to said user, via said GUI and simultaneously with the contents of said email message, the contents of said at least one attachment;
   wherein the native application in which said at least one attachment was originally created need not be launched by said user and wherein the content of said at least one attachment is editable by said user within the email reader application; and
   (f) wherein the contents of said email message comprises a conversation thread between said user and a plurality of collaborators working on a word processing document attached to said email and displaying to the user, via said GUI, a menu for selecting at least one version of the word processing document previously saved by one of the plurality of collaborators to display the contents of the selected version of the word processing document simultaneously with the contents of said email message wherein the selected version is displayed in a redline format indicating which of the plurality of collaborators made a corresponding change in the word processing document from a previous version of the word processing document.

2. The computer-implemented method of claim 1, wherein said step (e) comprises displaying the contents of said email message adjacent to the contents of said at least one attachment.

3. The computer-implemented method of claim 1, wherein each of said first input and said second input is a mouse click.

4. The computer-implemented method of claim 1, wherein said step (e) comprises displaying a sliding animation that results in the contents of said email message being displayed adjacent to the contents of said at least one attachment within said GUI of the email reader application.

5. The computer-implemented method of claim 1, further comprising the steps of:
   (g) receiving a third input from said user, wherein said third input is indicative of a selection of one of the previous messages within said conversation thread; and
   (h) displaying to the user, via said GUI and simultaneously with the contents of said email message, the contents of a version of said word processing document previously saved by one of said plurality of collaborators who authored said one of the previous messages selected in said step (g).

6. A computer program product comprising computer usable medium encoded in a computer having control logic stored therein for causing the computer to facilitate the simultaneous viewing of email messages and associated attachments within an email reader application, said control logic comprising:
   first computer readable program code means for causing the computer to provide a graphical user interface (GUI) to a user within the email reader application;
   second computer readable program code means for causing the computer to receive, via said GUI, a first input from said user, wherein said first input is indicative of an email message said user desires to open;
   third computer readable program code means for causing the computer to display to said user, via said GUI and in response to said first input, the contents of said email message, wherein said email message contains at least one attachment and further display to the user a preview of at least a portion of the at least one attachment prior to receiving a second input from the user, the preview displayed at a location corresponding to the location where the at least one attachment would be viewed upon receipt of the second input from said user;
   fourth computer readable program code means for causing the computer to receive, via said GUI, the second input from said user, wherein said second input is indicative of said user desiring to view the content of said attachment;
   fifth computer readable program code means for causing the computer to display to said user, via said GUI and simultaneously with the contents of said email message, the contents of said at least one attachment; wherein the native application in which said at least one attachment was originally created need not be launched by said user and wherein the content of said at least one attachment is editable by said user within the email reader application, wherein the contents of said email message comprises a conversation thread between said user and a plurality of collaborators working on a word processing document attached to said email; and
   sixth computer readable program code means for causing the computer to display to the user, via said GUI, a menu for selecting at least one version of the word processing document previously saved by one of the plurality of collaborators to display the contents of the selected version of the word processing document simultaneously with the contents of said email message wherein the selected version is displayed in a redline format indicating which of the plurality of collaborators made a corresponding change in the word processing document.

7. The computer program product of claim 6, wherein said fifth computer readable program code means comprises computer readable program code means for causing the computer to display the contents of said email message adjacent to the contents of said at least one attachment.

8. The computer program product of claim 6, wherein said fifth computer readable program code means comprises computer readable program code means for causing the computer to display a sliding animation that results in the contents of said email message being displayed adjacent to the contents of said at least one attachment within said GUI of the email reader application.

9. A computer system for facilitating the simultaneous viewing of email messages and associated attachments within an email reader application, comprising:
   (a) means for providing a graphical user interface (GUI) to a user within the email reader application;
   (b) means for receiving, via said GUI, an input from said user, wherein said first input is indicative of an email message said user desires to open;
   (c) means for displaying to said user, via said GUI and in response to said input, the contents of said email message, wherein said email message contains at least one attachment and further displaying to the user a preview of at least a portion of the at least one attachment prior to receiving a second input from the user, the preview displayed at a location corresponding to the location where the at least one attachment would be viewed upon receipt of the second input from said user;
   (e) means for displaying to said user in response to the second input, via said GUI and simultaneously with the contents of said email message, the contents of said at least one attachment and wherein the contents of said email message comprises a conversation thread between said user and a plurality of collaborators working on a word processing document attached to said email;
   (f) displaying to the user, via said GUI, a menu for selecting at least one version of the word processing document previously saved by one of the plurality of collaborators to display the contents of the selected version of the word processing document simultaneously with the contents of said email message wherein the selected version is displayed in a redline format indicating which of the plurality of collaborators made a relevant change in the word processing document; and
   (g) means for editing, within the email reader application, the contents of said at least one attachment;
   wherein the native application in which said at least one attachment was originally created need not be launched by said user.

* * * * *